April 24, 1951

G. L. FERNSLER 2,550,409

BALANCED DEMODULATOR

Filed Oct. 3, 1946

Inventor
George L. Fernsler
C&Nuska
Attorney

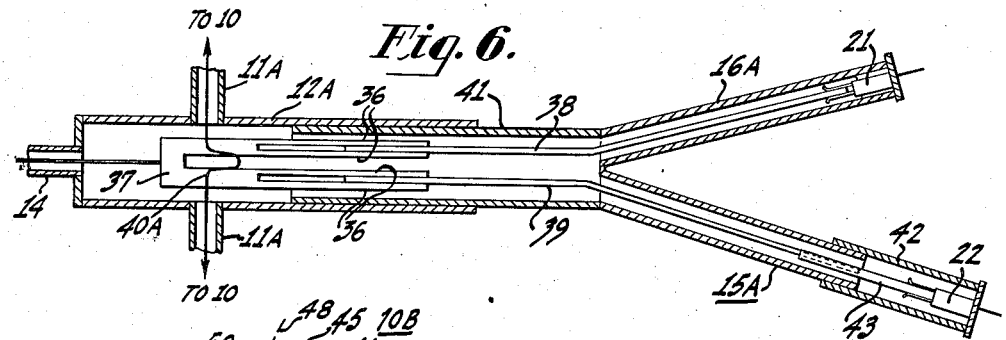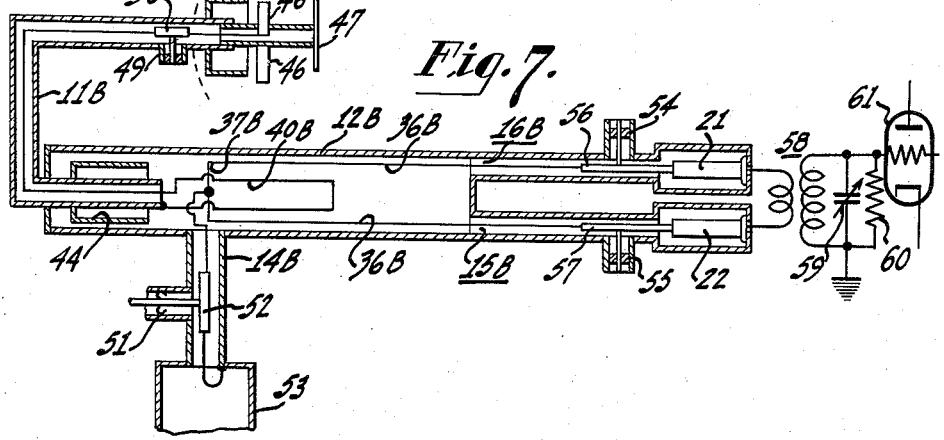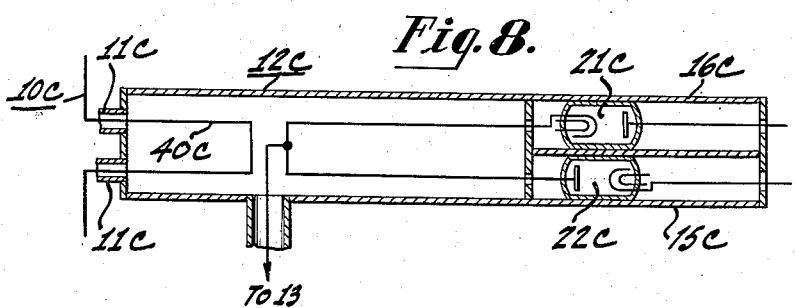

April 24, 1951  G. L. FERNSLER  2,550,409
BALANCED DEMODULATOR

Filed Oct. 3, 1946  3 Sheets-Sheet 3

Inventor
George L. Fernsler
Attorney

Patented Apr. 24, 1951

2,550,409

UNITED STATES PATENT OFFICE 2,550,409

BALANCED DEMODULATOR

George L. Fernsler, Lawrenceville, N. J., assignor to Radio Corporation of America, a corporation of Delaware Application October 3, 1946, Serial No. 700,879

24 Claims. (Cl. 250—20)

This invention relates to coupling systems for balanced modulator and demodulator systems and particularly relates to demodulator systems suited for use in frequency-modulated ultra high-frequency systems such as used for object location, height determination, and similar purposes.

In general, the use of balanced demodulators is of material advantage at ultra high-frequencies, such as three thousand megacycles and higher, because affording an enhanced signal-to-noise ratio not attainable at these frequencies by the use of preamplification. They are also of advantage in minimizing or precluding radiation from the antenna of the output of the local oscillator used for heterodyning received energy; this is of importance in avoidance of interference to other nearby receivers and of betrayal of the presence or location of the receiver.

In accordance with the invention, the signal from one source, specifically a receiving antenna, is fed, preferably by a balanced line, to a resonant cavity formed by a closed-ended section of wave guide or coaxial line and of such length that there are two regions within the cavity where the variations in the electric or electromagnetic fields are of opposite phase or polarity. These regions are respectively coupled, as by slots, loops, or probes, to two other wave-guide or coaxial-line sections to produce fields therein affording in-phase or out-of-phase response of the demodulators respectively associated therewith in dependence upon their poling and coupling. The latter pair of resonant cavities are also coupled to a second source of ultra high-frequency energy, specifically a local oscillator, for production of fields therein which are applied in-phase or out-of-phase to the demodulators; this second source through the coupling afforded by the aforesaid slots, loops, or probes produces fields in the first cavity which, however, mutually cancel.

The invention also resides in features of construction, combination and arrangement herein disclosed and claimed.

For a more detailed understanding of the invention and for illustration of various forms thereof, reference is made to the accompanying drawings, in which:

Figure 1 in perspective, partly broken away, shows a balanced demodulator utilizing three wave-guide sections;

Figure 2 is a sectional view taken on the broken line 2—2 of Figure 1;

Figure 2-A is a schematic plan view of the cavity structure of Figure 1;

Figure 1:
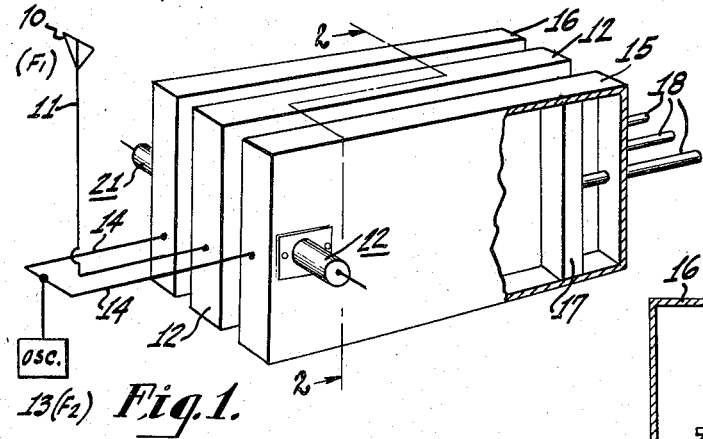
Figure 2:
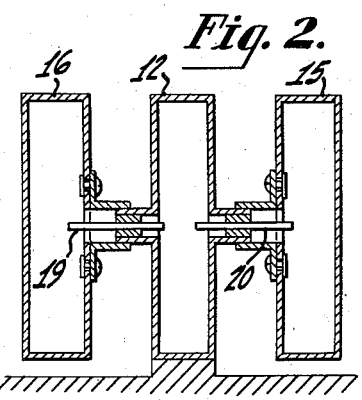
Figure 3:
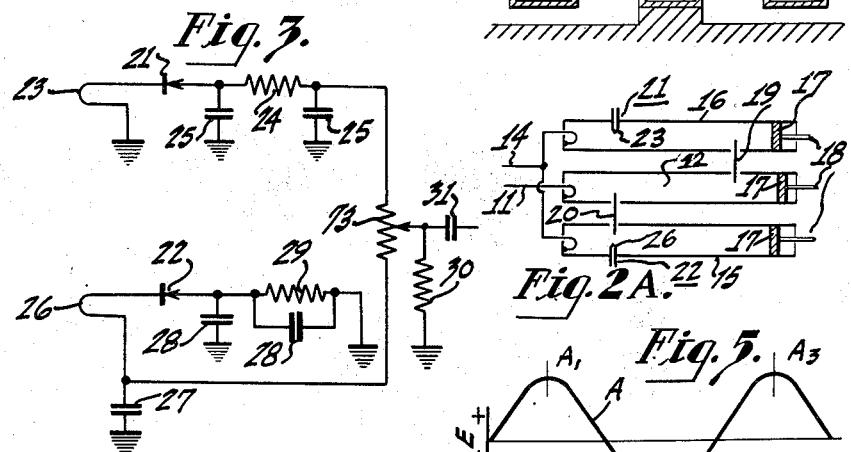
Figure 3 is a circuit diagram showing a preferred output circuit for the demodulators of Figures 1 and 3.
Figure 5:
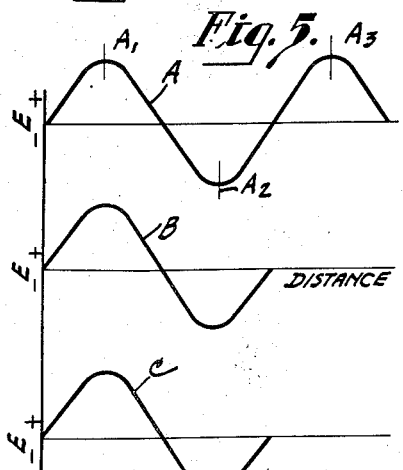
Figure 10:
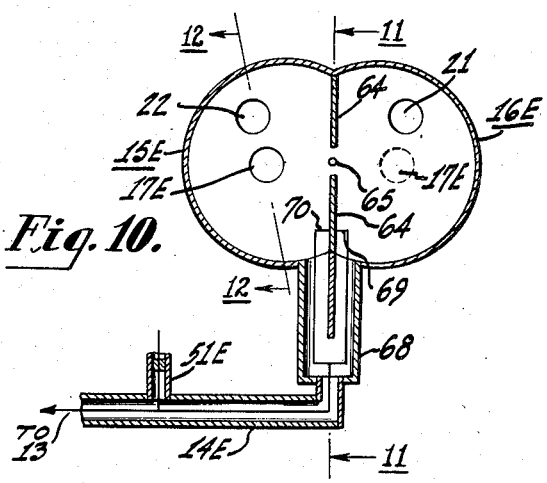

Figure 5 comprises explanatory curves referred to in discussion of Figures 1-3;

Figures 6–9 inclusive are sectional views of other modifications of the invention;

Figure 10 is a sectional view of still another modification; and

Figures 11, 12:
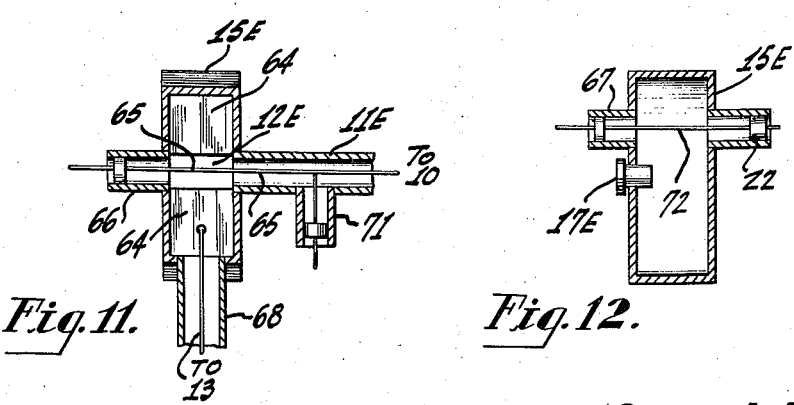

Figures 11 and 12 are sectional views taken respectively on lines 11—11 and 12—12 of Figure 10.

Referring to Figure 1, the antenna 10 or other source of ultra-high-frequency energy is connected by transmission line 11, which may be a wave guide or coaxial line, to the resonant cavity 12 which is a closed-ended section of a wave guide, the electrical length of which is $4+N$ quarter wavelengths, where N is zero or any even integer. There are thus produced, within the cavity 12, electric and electromagnetic fields having nodes and anti-nodes at definitely fixed positions axially of the cavity. Curve A of Figure 5 represents, at a particular instant, the electric field as a function of axial distance of the cavity: at a time interval corresponding with a half-cycle earlier or later, the curve A is inverted, the location of the nodes remaining at the ends and intermediate half-wave points.

A second source 13 of ultra-high-frequency energy, for example a local oscillator, is connected, preferably by a lossy concentric line 14, to two resonant cavities 15 and 16 which, in this modification of the invention, are also two closed-ended waveguide sections. The electrical length of each of the cavities 15 and 16 is selected or adjusted to be $$\frac{2+M}{4}$$

wavelengths long, where M is zero or any even integer. There are thus produced, within each of cavities 15 and 16, electric and electromagnetic fields having nodes and anti-nodes at fixed positions axially of it. Curves B and C of Figure 5 represent the electric fields in cavities 15 and 16 respectively each as a function of distance along the axis of the cavity. With the cavities similarly excited from corersponding ends, the fields vary in phase; at a time interval corresponding with a half-cycle earlier or later, both curves B and C are inverted from the full line position shown with nodes at the ends and the half-wave point or points.

Preferably, and as indicated in Figure 2-A, each of the three cavities is tunable by a plunger 17 adjustable externally of the cavity by a rod 18 or equivalent.

The cavity 12 is coupled to the cavities 15 and 16 by slots, loops, or probes so positioned with respect to the electric or electromagnetic fields within the cavity 12 that the energies they transfer to cavities 15 and 16 are 180° out of phase.

Figure 2A:
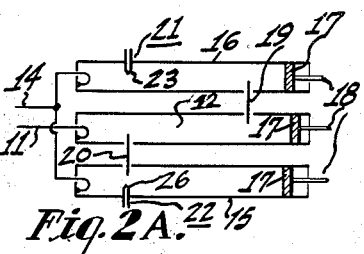

In the particular arrangement shown, the transfer is effected by the probes 19 and 20, Figure 2A, entering cavity 12 from opposite side walls thereof and spaced from each other axially of the cavity 12 by Q quarter wavelengths where Q is an even integer: furthermore, the electrical length of the cavity between each of the probes and the near closed end of the cavity is an odd number of quarter wavelengths. Referring to curve A, Figure 5, one of the probes, for example probe 20, may be positioned at the point A1 or point A3 along one side wall of the cavity 12 and the other probe 19 may be positioned at point A2 along the opposite side wall of the cavity. In Figure 2A, the cavity 12 is a wave-length long and the probes are in positions corresponding with A1 and A2, Figure 5.

The wavelengths thus far mentioned in connection with the length of cavity 12 and the spacing of the probes 19 and 20 are in terms of frequency F1 of source 10 and as measured within the guide, not as measured in free space.

With respect to cavities 15 and 16, the probes 19 and 20 enter them at such points that with respect to the fields therein produced by the source 13 each tends to produce in the cavity 12 an electric or electromagnetic field whose standing wave pattern is the opposite of that produced by the other probes. Hence, there is little or no energy of frequency F2 of oscillator 13 transmitted through the resonant cavities to the transmission line 11 extending to the antenna 10. Conversely, because of the relations above stated, there is little or no transfer of energy of frequency F1 through the resonant cavities to the transmission line 14.

It is to be further noted that each of the shielded probes 19 and 20 enters the respective cavity 16 or 15 at a point which is an odd number of quarter wavelengths (at frequency F2) from the near closed end of the cavity. When the difference between the frequency of F1 and F2 expressed as a percentage of either of them is quite small, the cavities may for convenience be all of the same length as shown, and the positions of the tuning plungers will be approximately the same.

By way of example, for frequencies of about 3000 megacycles (10 cm.) each of the wave-guide sections 12, 15 and 16 may have internal dimensions 20 cm. x 7 cm. x 1.27 cm., the extra internal length allowing tuning from about 10 cm. to about 12 cm. and permitting reasonable length of the tuning plunger. The wave-guide sections need not be of rectangular cross section though that configuration is preferred because it is simpler to predict the field patterns and possibility of excitation of the cavities at undesired modes is avoided. The arrangement specifically shown and described affords mechanical and electrical simplicity in obtaining the desired phase relations above disclosed.

In attainment of the proper relative positions of the probes and for matching of impedances, the cavities 15 and 16 may be adjusted toward or away from the center cavity 12, Figure 2, to vary the extent to which the probes extend into the electrical fields of the cavities and further, each of the cavities 15 and 16 may be moved lengthwise of and parallel to the center of cavity 12 so that the inner ends of the probes 19 and 20 are at points of desired or maximum difference of potential of the electric field therein. When loops or slots are used as coupling means, a generally similar arrangement should be provided for adjustment of the coupling and of the phasing.

The demodulators 21 and 22, Figure 3, respectively associated with the outer cavities 16 and 15 are suitably coupled to the fields therein by loops or probes. In the particular arrangement shown, the coupling is to the electro-magnetic fields and is effected by loops so located and oriented that with respect to the fields of frequency F1 produced within the cavities by the aforesaid coupling to cavity 12 their outputs may be out-of-phase but are in-phase with respect to the fields of frequency F2 produced within the cavities 15 and 16 by the aforesaid coupling to the oscillator 13 or equivalent.

Specifically, the loop 23 which enters the left face of cavity 16 (Fig. 1) at a point or region which is a selected or adjusted to be about a quarter wavelength from the near closed end of the cavity, is connected (Fig. 3) to one terminal of rectifier 21, a diode or crystal rectifier of the selenium or equivalent metallic type, whose other terminal is connected to one terminal of coupling impedance 73 through a filter network comprising series resistor 24 and parallel capacitors 25, and designed to attenuate the frequencies F1 and F2. The loop 26 which enters the cavity 15 (Fig. 1) through the right-hand face at the corresponding region of cavity 15, or a region which is an even number of quarter wavelengths from said region, is connected (Fig. 3) to one terminal of rectifier 22 whose other terminal is connected to wall structure of the cavity through the filter network comprising the parallel capacitors 28 and parallel resistor 29, and designed to attenuate the frequencies F1 and F2. The other terminal of loop 26 is effectively connected by bypass condenser 27 to the cavity so far as frequencies F1 and F2 are concerned and for the modulation or demodulation frequencies is conductively connected to the other or lower terminal of the impedance 73. Coupling to an intermediate or audio-frequency amplifier is effected by the output impedance 30 and coupling capacitor 31. By adjustment of the movable contact of the impedance 73 either push-pull or push-push operation may be attained.

Figure 4:
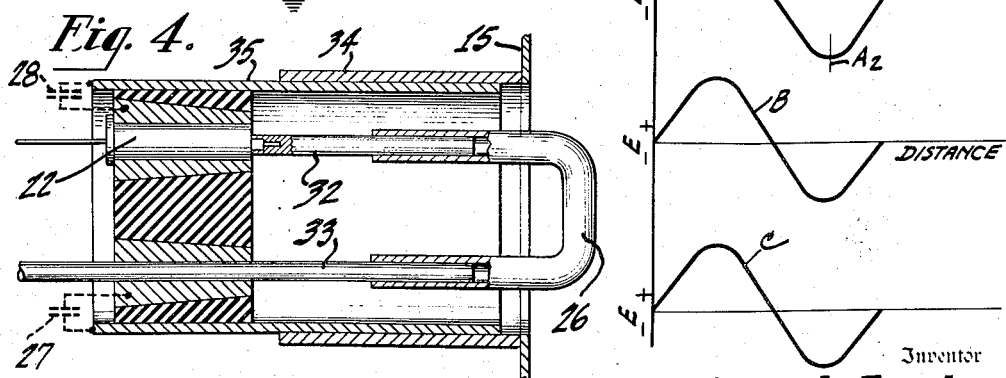
Figure 4 is a sectional view on enlarged scale of one of the demodulator units of Figure 1.

A preferred physical construction of the arrangement for coupling the demodulator 22 to the cavity 15 is shown in Figure 4. The legs of the U-shaped member forming the loop 26 slidably receive the conductors 32 and 33 to form a tunable section of a parallel-conductor transmission line whose fields are confined by the metal sleeve or tube 34 suitably held against or attached to the outer wall of cavity 15. The inner sleeve 35 which slidably and rotatably engages the outer tube 34 serves as an extension of the shield for the line 32—33 and as a support for a plug of insulation in which is mounted a metallic insert forming a holder for the crystal rectifier 22. The distributed capacity between this insert and the sleeve 35 forms one of the filter capacitors 28; the distributed capacity between the sleeve 35 and a second insert for the conductor 33 forms the bypass capacitor 27. The unit comprising sleeve 35 may be withdrawn for adjustment of the electrical length of the line comprising loop 26 and conductors 32, 33 to a half wavelength or other even number of quarter wavelengths. With the unit in place it may be adjusted axially of the tube 34 to vary the coupling to cavity 15 and so attain the desired matching in compensation for differences between the impedances of different crystals.

The outer face of the cavity 15 may be slotted lengthwise to allow adjustment of the demodulator unit for coupling to the desired region within the cavity: in such case the slot is covered by a slidable metallic plate, except at region of entry of the coupling loop.

A generally similar arrangement is used for coupling the rectifier 21 to cavity 15 except, as apparent from Figure 3, the line conductor which does not include the crystal rectifier 21 is conductively connected to the shell 35.

With the external connections of the sources to the cavities as shown in Figure 1, noise in the oscillator output is balanced out so to improve the ratio of the received signal to noise produced within the receiver: by interchanging the sources 10 and 13, amplitude modulation in the received signal may be balanced out.

All of the modifications subsequently described, though differing specifically from each other and from the form of the invention shown in Figures 1-4, are alike in fundamental features of construction and operation; consequently for brevity the corresponding elements of the various modifications are in general identified by like reference characters differing only in suffix and the remainder of the description is principally directed to significant differences of construction or arrangement. In general, the modifications using closed-end coaxial lines for all three resonant cavities are more practical for ultra high frequencies up to about 4000 megacycles whereas those using wave guide sections for all three cavities are more practical for frequencies from about 4000 megacycles to possibly 30,000 megacycles. In the range of from about 3000 megacycles to about 4000 megacycles, the combination of coupled cavities may include both types of resonant cavities.

In the modification shown in Figure 6, the cavity 12A is a closed section of coaxial line whose inner conductor is divided to form a U-shaped loop having legs 36 extending from the closed end 37 of the loop which is presented to the left-hand or closed end of the cavity. The legs 36 of the loop slidably receive the conductors 38 and 39 which form continuations thereof and extend respectively to form the inner conductors of the smaller concentric lines 16A and 15A. By design or adjustment the impedance of each of the lines 15A and 16A is one-half the impedance of the line 12A, so to effect an impedance match at the junction of the lines. The loop 40A connected by a balanced transmission line 11A to the source 10 is symmetrically disposed within the cavity 12A in inductive relation to the loop 37 so that the energies transferred from the source 10 by the concentric line 12A to the lines 15A and 16A are 180° out of phase.

The inner conductor of transmission line 14 from the other source of ultra-high-frequency energy connects to the electrical midpoint of the loop 37 so that so far as the second source 13 is concerned, the energies transmitted therefrom by the line 12A to the lines 15A and 16A are in phase.

The sleeve 41, the conductors 38 and 39, and the lines 15A and 16A are adjustable as a unit for tuning of the cavity or line 12A. To obtain equality of the reactances of the lines 15A and 16A as seen by the cavity 12A, provision is made to adjust the electrical lengths of one or both of the lines 15A or 16A. For example as shown, the sleeve 42 and conductor 43 move as a unit and form a telescoping extension of the conductors of the line 15A. In general, this modification is similar to that of Figure 1 except that the desired relations are obtained by use of resonant cavities of the concentric-line type rather than the waveguide section type.

In the modification shown in Figure 7, the coupling loop 40B is provided at the end of concentric line 11B which extends into the cavity 12B and is effectively balanced by the quarter-wave cavity choke 44. The overlap of the loops 40B and 36B—37B is about one-half wavelength and the electrical length of cavity 12B between its junction with lines 14B and its junction with lines 15B and 16B is an odd number of quarter wavelengths, preferably not greater than five. Balance at the antenna end of the line 11B is effected by a similar choke 45 positioned between the main reflector 48 and the dipole antenna elements 46 respectively connected to the inner and outer conductors of the line 11B, which is terminated at its antenna end by the minor-reflector disc or plate 47. An impedance match at the antenna end of the line 11B is effected by the adjustable stub line 49 associated with a wide-banding transformer 50 symmetrical with respect to the stub 49.

A similar arrangement comprising the adjustable stub 51 and wide-banding transformer 52 is provided in the input line 14B between the cavity 12B and the second source of ultra-high-frequency energy, which may be an oscillator provided with a resonant cavity 53.

In this modification, the matching and balancing of the impedances of the concentric lines 15B and 16B are effected by the tuning stub and broad-band transformer arrangements 55, 57 and 54, 56 respectively. By way of example, the transformer sections 50, 52, 56 and 57 may each be one half wavelength long and the associated closed stub section 49, 51, 54 and 55 one quarter wavelength long. In each case, the impedances of the line, stub and transformer section suited to provide satisfactory matching over the band swept by the frequency-modulated signal may be determined from the following equation. (It is assumed the ratio of band width to mean frequency is, as usual, small; for example, the band width may be 40 megacycles and the mean frequency 3000 megacycles.)

(1) $$\frac{Z_1}{Z_0} = 2\left[\left(\frac{Z_A}{Z_1}\right)^2 - 1\right]$$

wherein $Z_1$ = impedance of the transformer section
$Z_0$ = impedance of the stub section
$Z_A$ = impedance of the line The length of each of the stubs is preferably adjustable to facilitate matching or rematching. The broad-band action for an assumed load impedance, such as that of crystal rectifier 21 or 22, is adaptable to rematching by adjustment of the corresponding stub 54 or 55 in compensation for reasonable deviations from the assumed value.

Coupling of the rectifiers 21 and 22 to the associated amplifier tube 61 may be effected by transformer 58 tuned to resonance by condenser 59 and damped by resistor 60 for suitable broadening of its resonance characteristic to encompass the desired modulation band.

In the modification shown in Figure 8, as in that of Figure 6, energy from source 10 is introduced into the cavity 12C by a loop 40C formed by a continuation of the inner conductor of the balanced transmission line 11C. The rectifiers 21C and 22C disposed respectively in the smaller lines 15C and 16C are diodes, known as McNally tubes, designed for enclosure in a concentric line. Because of construction of the tubes, it is necessary to connect the cathodes together or use separate power supplies for their heaters. The latter arrangement is chosen for use of the unit, Figure 8, as a balanced detector or demodulator.

Figure 9:
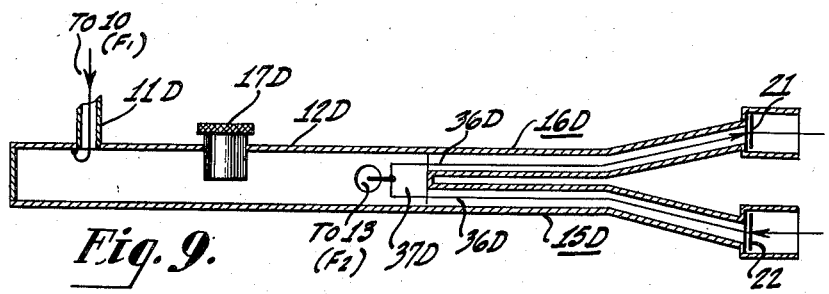

The modification shown in Figure 9 is similar to that of Figure 1 in that the resonant input cavity connected to source 10 is of the wave-guide type and is similar to the modifications shown in Figures 6-8 in that the demodulator cavities 15D and 16D are of the concentric-line type. The energy from source 10 may be introduced into the cavity 12D in any suitable manner, for example by concentric line 11D whose inner conductor forms a loop within the cavity. The resonant frequency of cavity 12D may be varied by adjustment of the tuning plug 17D or equivalent. As in the modifications of Figures 6-8, the inner conductors 36D of the lines 15D and 16D are joined to form a loop 37D whose electrical midpoint is connected to the inner conductor of the transmission line extending from the second source 13 of ultra-high-frequency energy. The energies to lines 15D and 16D from source 13 are, therefore, in phase. However, as the fields of frequency F1 at opposite sides of the cylindrical cavity 12D are 180° out of phase, the energies of that frequency picked up by loop 37D and delivered to lines 15D and 16D are out of phase. The length of at least one of lines 15D, 16D may be adjustable in manner and for reasons discussed in connection with Figure 6.

In the modification shown in Figures 10-12, the resonant cavities 15E and 16E are semi-cylindrical and have a common partition or wall 64 with a central slot. The radius of each of the cavities is selected for resonance at the desired frequency: for example, for frequencies corresponding with wavelengths of about 7 centimeters the radius may be about 2.62 centimeters. Tuning is effected by adjustment of plugs 17E or equivalent. A continuation of the inner conductor 65 of the line 11E from source 10 excites the cavities in push-pull relation. Matching of the line 12E formed by conductor 65 and wall structure is provided for by the tuning stubs 66 and 71, the former in alignment with transmission 11E and extending from the opposite face of the cavity structure. The tuning plungers of these stubs are adjusted to provide a current anti-anode or conductor 65 midway of its length between the opposite faces of the cavity structure. The cavities 15E and 16E are excited in push-push relation from source 13 by the loops 69 and 70 formed by extensions of the inner conductors of two coaxial lines 68 branched from the transmission line 14E. Matching is provided by the stub 51E: alternatively, each of lines 68 may be provided with a stub.

Coupling to each of the rectifiers 21 and 22, which may be crystals or diodes, is effected by a conductor 72, Figure 12, extending across the corresponding cavity from one terminal of the rectifier to the opposite side of the cavity. For matching, the conductor 72 forms the inner conductor of a stub 67 whose adjustable plunger determines the effective electrical length of the stub.

As in all modifications previously herein described, although both signal sources are coupled to the demodulators the coupling between the sources are balanced out; also, the noise or amplitude modulation undesirably present in one of the signals is balanced out so that it does not to substantial extent appear in the joint output of the demodulators.

Although all the coupling arrangements disclosed have been described as utilized for balanced demodulation systems, they are adaptable for use in balanced modulation systems as well. This involves change in sense of the transfer of the modulation-frequency energy, that is, the rectifiers are in a supply circuit rather than a load circuit; moreover, the antenna circuit becomes a load circuit rather than a signal source so far as the coupling arrangement is concerned. With these differences in mind, however, the adaption of the various arrangements for use in balanced modulator systems particularly suited for operation at ultra high frequencies should be evident to those skilled in the art.

It shall be understood the invention is not specifically limited to the particular embodiments shown but that changes and modifications may be made within the scope of the appended claims.

I claim as my invention:

1. A balanced ultra-high-frequency demodulator comprising a resonant cavity, a source of ultra high frequency coupled to said cavity to produce a field therein, a pair of resonant cavities provided with rectifier devices and respectively coupled to said first-named cavity at regions in said first-named cavity where the field energies are in phase opposition and a second source of ultra high frequency coupled to each of said pair of cavities to produce in said pair of cavities fields which are in phase and to produce in said first-named cavity, by its aforesaid coupling with said pair of cavities, fields which mutually cancel.

2. A balanced ultra-high-frequency demodulator comprising two sources of ultra high frequency, a closed wave-guide section coupled to one of said sources, a pair of wave-guide sections, means coupling said pair of sections to said first-named section at regions where the variations of the field produced by said one of said sources are in phase opposition, means coupling the other of said sources to said pair of sections to produce therein in-phase fields which through said first-named coupling means produce mutually cancelling fields in said first-named section, and demodulating means associated with said pair of cavities for in-phase response to fields therein due to one of said sources and for out-of-phase response to fields therein due to the other of said sources.

3. A coupling system comprising a cavity whose electrical length is $$\frac{4+n}{4}$$

wavelengths where $n$ is zero or an even integer, two rectifier cavities each having an electrical length of $$\frac{2+n}{4}$$

wavelengths, and means for effecting coupling between each of the rectifier cavities and the first-named cavity at regions each an odd number of quarter wavelengths from an end of the corresponding cavity, said regions of the first-named cavity being spaced from one another by an even number of quarter wavelengths.

4. A balanced ultra-high-frequency demodulator system comprising an input cavity whose electrical length is $$\frac{4+n}{4}$$

wavelengths where $n$ is zero or an even integer, means for introducing received ultra-high-frequency energy into said cavity, two demodulator cavities each having an electrical length of $$\frac{2+n}{4}$$

wavelengths, a local oscillator for similarly exciting said demodulator cavities, and means for effecting coupling between each of the demodulator cavities and the input cavity at regions each an odd number of quarter wavelengths from an end of the corresponding cavity, said regions of the input cavity being spaced from one another by an even number of quarter wavelengths.

5. A balanced ultra-high-frequency coupling system comprising three closed resonant cavities arranged side by side, means for introducing ultra-high-frequency energy into the intermediate cavity, and means for effecting transfer of ultra-high-frequency energy from said intermediate cavity at regions spaced from each other an even number of quarter wavelengths longitudinally thereof to the outer cavities respectively.

6. A balanced ultra-high-frequency coupling system comprising three closed resonant cavities arranged side by side, and a pair of coupling elements each extending through adjacent sides of the intermediate cavity and one of the outer cavities at regions spaced from the nearer end of the corresponding cavity by an odd number of quarter wavelengths, said coupling elements extending through opposite sides of the intermediate cavity from regions spaced longitudinally from each other by an even number of quarter wavelengths.

7. A balanced demodulator for ultra-high-frequency systems comprising three closed resonant cavities arranged side by side, means for introducing into the intermediate cavity energy whose frequency substantially corresponds with the resonant frequency of that cavity, means for introducing into the outer cavities, at corresponding regions thereof and in phase, energy whose frequency substantially corresponds with their resonant frequency, and means for effecting coupling between regions of the intermediate cavity which are spaced longitudinally from each other by an even number of quarter wavelengths and regions of the outer cavities each spaced from the nearer end of the corresponding outer cavity by an odd number of quarter wavelengths.

8. A balanced ultra-high-frequency coupling system comprising three wave-guide sections arranged side by side, field-coupling means between the intermediate section and each of the outer sections, and means for adjusting each of the outer sections in directions longitudinally and transversely of the intermediate section to obtain desired phasing and impedance matching.

9. A balanced ultra-high-frequency demodulator comprising a pair of coaxial lines whose inner conductors extend beyond the open ends of the lines and are joined to form a loop, a resonant cavity whose outer conductor forms a continuation of the outer conductors of said lines and within which said loop is enclosed, demodulators in the closed ends of said lines, a source of signal energy connected to the closed end of said loop and to said outer conductor for in-phase response of said demodulators, a second source of signal energy, and means coupling said second source to said cavity to produce therein an electromagnetic field which through said loop effects out-of-phase response of said demodulators.

10. A balanced ultra-high-frequency demodulator comprising a coaxial-line section open at one end and whose inner conductor is divided forming a loop having its open ends directed toward the open end of said line, a source of ultra high frequency connected to the closed end of said loop and to the outer conductor of said line, a second source of ultra high frequency inductively coupled to said loop, a pair of coaxial lines extending from the open end of said line section with their inner conductors forming extensions of the open ends of said loop and their outer conductors jointly closing the open end of said section, the impedances of said lines being equal and substantially half the impedance of said section, and demodulators in said coaxial lines for in-phase response to one of said sources and out-of-phase response to the other of said sources.

11. A balanced ultra-high-frequency demodulator comprising a pair of coaxial lines whose outer conductors are the continuation of the outer conductor of a larger line and whose inner conductors are joined to form a loop in said larger line, means adjustable to effect a match between the impedance of the larger line and the joint impedance of said pair of lines, demodulators in said pair of lines, means adjustable to effect equality of the surge impedances of said pair of lines, a sources of ultra high frequency inductively coupled to said loop, and a second source of high frequency connected between the midpoint of said loop and a point on the outer conductor.

12. A coupling system for a balanced ultra-high-frequency demodulator or modulator comprising a pair of coaxial lines whose outer conductors merge to form the outer conductor of a larger line and whose inner conductors are joined to form a loop in said larger line, the closed end of said loop and the adjacent portion of said larger outer conductor being adjustable in unison for matching of the impedance of the larger line to the resultant of the impedances of said pair of lines, and rectifiers in said pair of lines.

13. A coupling system for a balanced ultra-high-frequency demodulator or modulator comprising a pair of coaxial lines whose outer conductors merge to form the outer conductor of a larger line and whose inner conductors are joined to form a loop in said larger line, the closed end of said loop and the adjacent portion of said larger outer conductor being adjustable in unison for matching of the impedance of the larger line to the resultant of the impedances of said pair of lines, rectifiers in said pair of lines, and means for varying the effective length of at least one of said pair of lines to balance the impedances of said pair of lines.

14. A coupling system for a balanced ultra-high-frequency demodulator or modulator comprising a pair of coaxial lines whose outer conductors form the continuation of the outer conductor of a resonant cavity and whose inner conductors are joined within said cavity to form a loop, rectifiers in said pair of lines, a matching stub for at least one of said lines to effect equality of their impedances as seen at the junction with said cavity, an input line connected to the closed end of said loop and to said outer conductor, and a second input line terminating within said cavity in a loop coupled to said first-named loop.

15. A balanced ultra-high-frequency coupling system comprising a pair of resonant cavities coupled by a slot, a concentric line whose outer conductor terminates at said cavities and whose inner conductor extends along said slot for in-phase excitation of or by said cavities, and a second concentric line whose outer conductor terminates at said cavities and whose inner conductor forms loops in said cavities for out-of-phase excitation of or by said cavities.

16. A balanced ultra-high-frequency demodulator comprising a pair of resonant cavities coupled by a slot, two sources of ultra high frequency, a concentric line from one of said sources and whose outer conductor terminates at said cavities and whose inner conductor extends along said slot for in-phase excitation of said cavities, a second concentric line from the other of said sources and whose outer conductor terminates at said cavities and whose inner conductor forms loops in said cavities to effect out-of-phase excitation thereof, means for matching the impedances of said cavities, and means for matching the impedances of said lines to the joint impedances of said cavities.

17. A balanced ultra-high-frequency coupling system comprising cavity structure including a pair of resonant cavities coupled by a slot in their common wall structure, a concentric line whose outer conductor terminates at said cavity structure and whose inner conductor extends within said slot for in-phase exchange of energy with respect to said cavities, and a second concentric line whose outer conductor terminates at said cavity structure and whose inner conductor forms loops respectively disposed in said cavities for in-phase exchange of energy.

18. A balanced ultra-high-frequency device as in claim 1 in which each of the three resonant cavities is a closed-ended section of waveguide.

19. A balanced ultra-high-frequency device as in claim 1 in which the resonant cavities for the rectifier devices are each a coaxial line whose inner conductor joins the inner conductor of the other line to form a loop within the first-named resonant cavity of claim 1.

20. A balanced ultra-high-frequency device as in claim 1 in which the resonant cavities for the rectifier devices are each a coaxial line whose inner conductor is extended for joining the inner conductor of the other line to form a loop within the first-named resonant cavity of claim 1 and in which said first-named resonant cavity is a coaxial line whose outer conductor is a continuation of the outer conductors of the aforementioned coaxial lines and whose inner conductor is divided and joins the extensions of the aforesaid inner conductors thereof in formation of said loop.

21. A balanced ultra-high-frequency device as in claim 1 in which the resonant cavities for the rectifier devices are each in coaxial line whose inner conductor joins the inner conductor of the other line to form a first loop within the first-named resonant cavity of claim 1 and in which a second loop within said first-named cavity couples it to the first-named ultra-high-frequency source of claim 1.

22. A balanced ultra-high-frequency device as in claim 1 in which the resonant cavities for the rectifier devices are each a coaxial line whose inner conductor joins the inner conductor of the other line to form a first loop within the first-named resonant cavity of claim 1 and in which the first-named ultra-high-frequency source of claim 1 is coupled to the first-named cavity thereof and to the aforesaid coaxial lines by a second loop overlapping the aforesaid first loop.

23. A balanced ultra-high-frequency device as in claim 1 in which the resonant cavities for the rectifier devices are each a coaxial line whose inner conductor joins the inner conductor of the other line to form a first loop within the first-named resonant cavity of claim 1 and in which a second loop within said first-named cavity is connected to the first-named ultra-high-frequency source of claim 1 by a balanced transmission line.

24. A balanced ultra-high-frequency device as in claim 1 in which the resonant cavities for the rectifier devices are each a coaxial line whose inner conductor joins the inner conductor of the other line to form a loop within the first-named resonant cavity of claim 1 and in which said first-named resonant cavity is a close-ended section of wave-guide which is a continuation of the outer conductors of said coaxial lines.

GEORGE L. FERNSLER.

REFERENCES CITED

The following references are of record in the file of this patent:

UNITED STATES PATENTS

| Number | Name | Date |
|---|---|---|
| 2,410,006 | Blitz | Oct. 29, 1946 |
| 2,410,122 | Mercer | Oct. 29, 1946 |
| 2,411,289 | Mouromtseff et al. | Nov. 19, 1946 |
| 2,416,080 | Bailey | Feb. 18, 1947 |
| 2,469,222 | Atwood et al. | May 3, 1949 |